(12) United States Patent
Schremmer et al.

(10) Patent No.: US 6,518,927 B2
(45) Date of Patent: Feb. 11, 2003

(54) PC CARD FOR ELECTRONIC DEVICES

(75) Inventors: Andreas Michael Schremmer, Gerglen (DE); Gerhard Geisemann, Esslingen (DE); Charles Alfred Centofante, Los Altos, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/923,204

(22) Filed: Aug. 6, 2001

(65) Prior Publication Data

US 2002/0021252 A1 Feb. 21, 2002

(30) Foreign Application Priority Data

Aug. 5, 2000 (DE) .......................................... 100 38 287

(51) Int. Cl.[7] .................................................. H01Q 1/24
(52) U.S. Cl. ........................... 343/702; 343/906; 455/90
(58) Field of Search .......................... 343/700 MS, 702, 343/906; 455/90

(56) References Cited

U.S. PATENT DOCUMENTS

| | | | |
|---|---|---|---|
| 5,657,028 A | * 8/1997 | Sanad .................. | 343/700 MS |
| 6,213,403 B1 | 4/2001 | Bates, III .................... | 235/492 |
| 6,244,894 B1 | * 6/2001 | Miyashita ................... | 439/500 |
| 6,259,409 B1 | * 7/2001 | Fulton et al. ............... | 343/702 |
| 6,330,151 B1 | * 12/2001 | Bates, III ................... | 361/686 |
| 6,377,218 B1 | * 4/2002 | Nelson et al. .............. | 343/702 |

* cited by examiner

*Primary Examiner*—Don Wong
*Assistant Examiner*—Shih-Chao Chen
(74) *Attorney, Agent, or Firm*—Roger C. Turner

(57) ABSTRACT

A PC card for insertion into a slot of a portable computer or other electronic device, has an antenna that allows the electronic device to send and receive data through radio waves. The antenna is moveable from a stowed position wherein most of the antenna lies in the PC card housing, and a first deployed position wherein most of the antenna projects rearwardly through an opening at the rear of the housing so radio waves can be transmitted and received. The antenna can be mounted on a tray that is moveable forwardly and rearwardly into and out of the rear of the housing. The tray can form a smart card-receiving recess that receives a small smart card to enable connection to pads on the smart card so as to provide authorization for communication through a wireless telephone network.

9 Claims, 7 Drawing Sheets

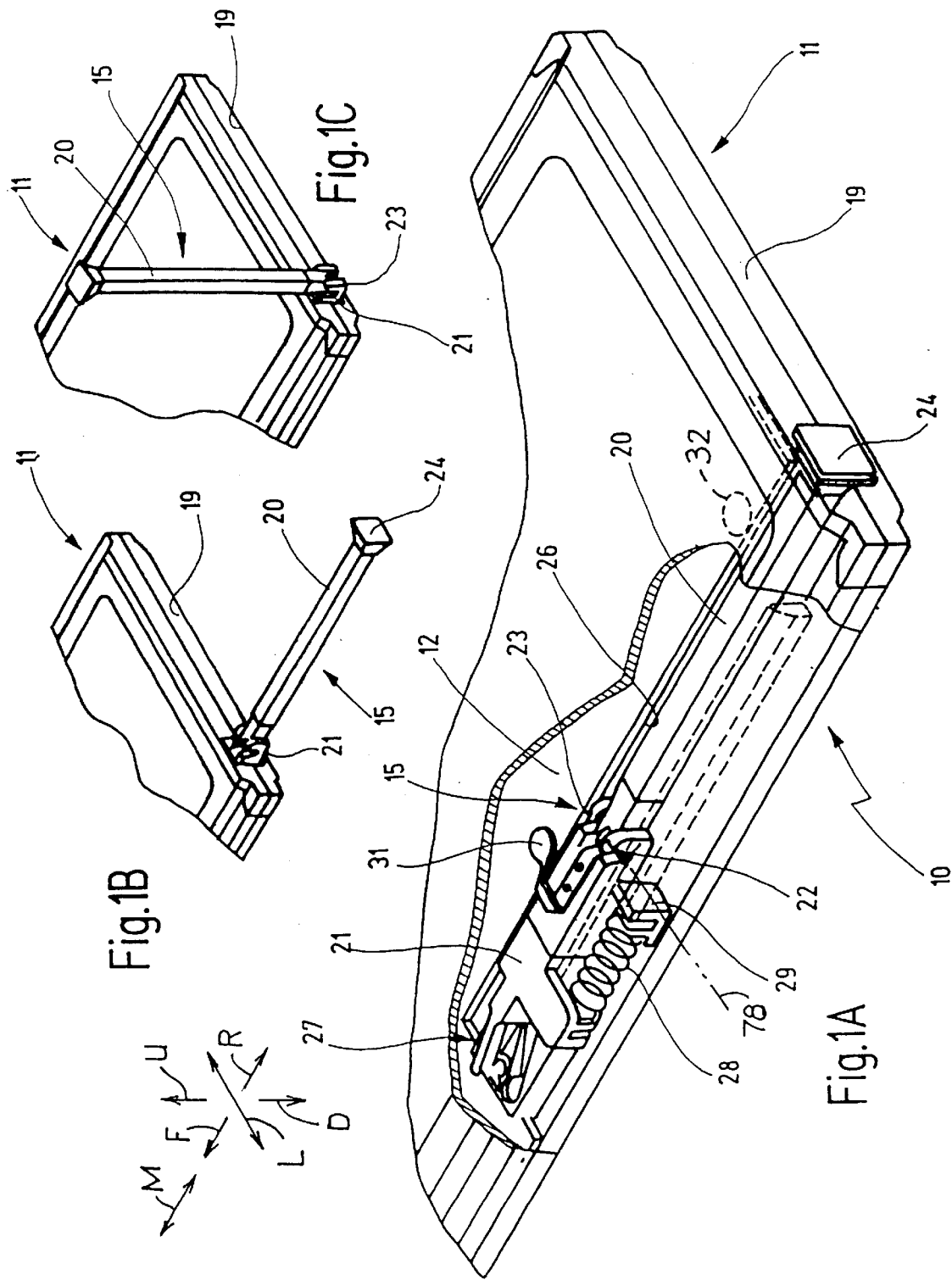

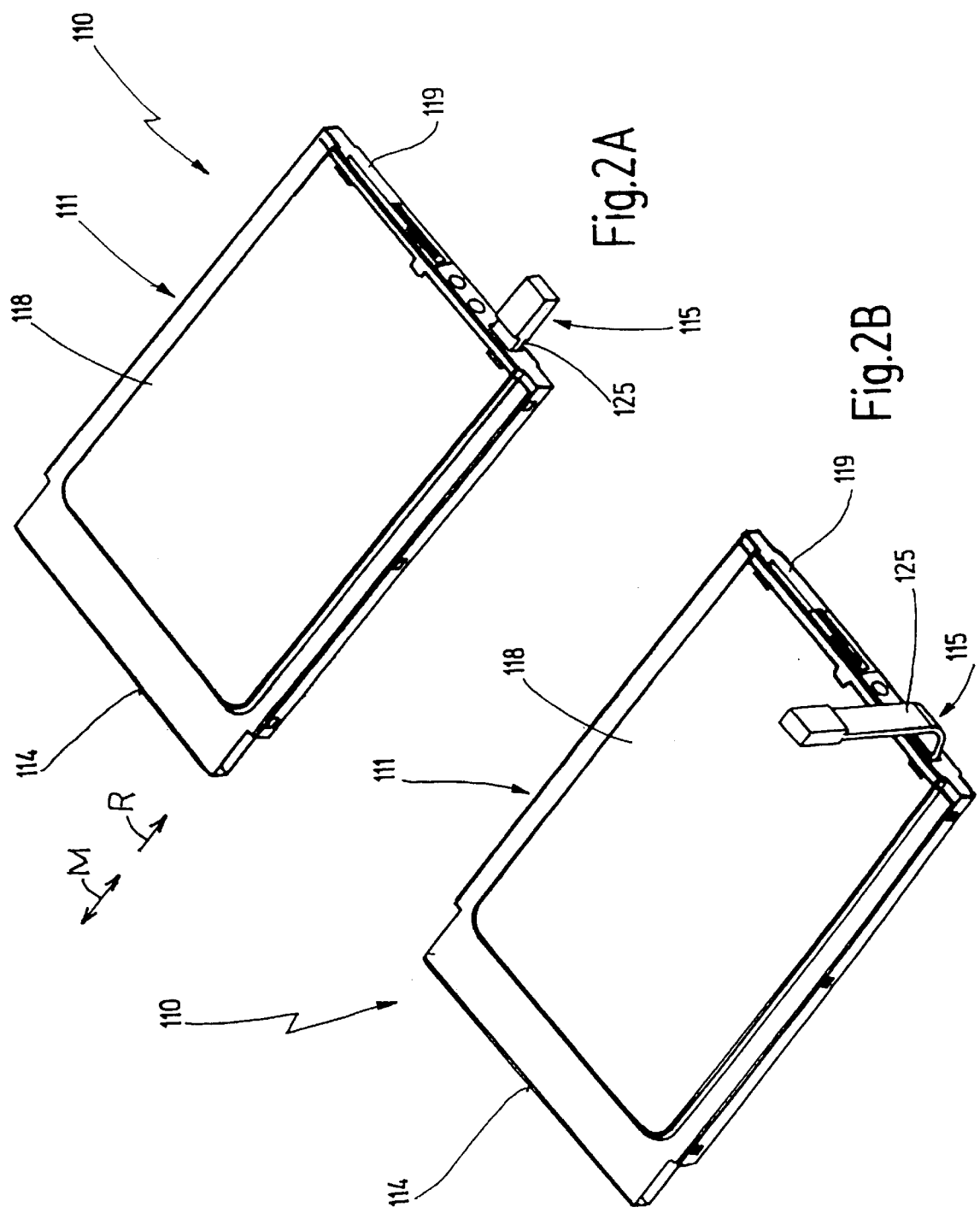

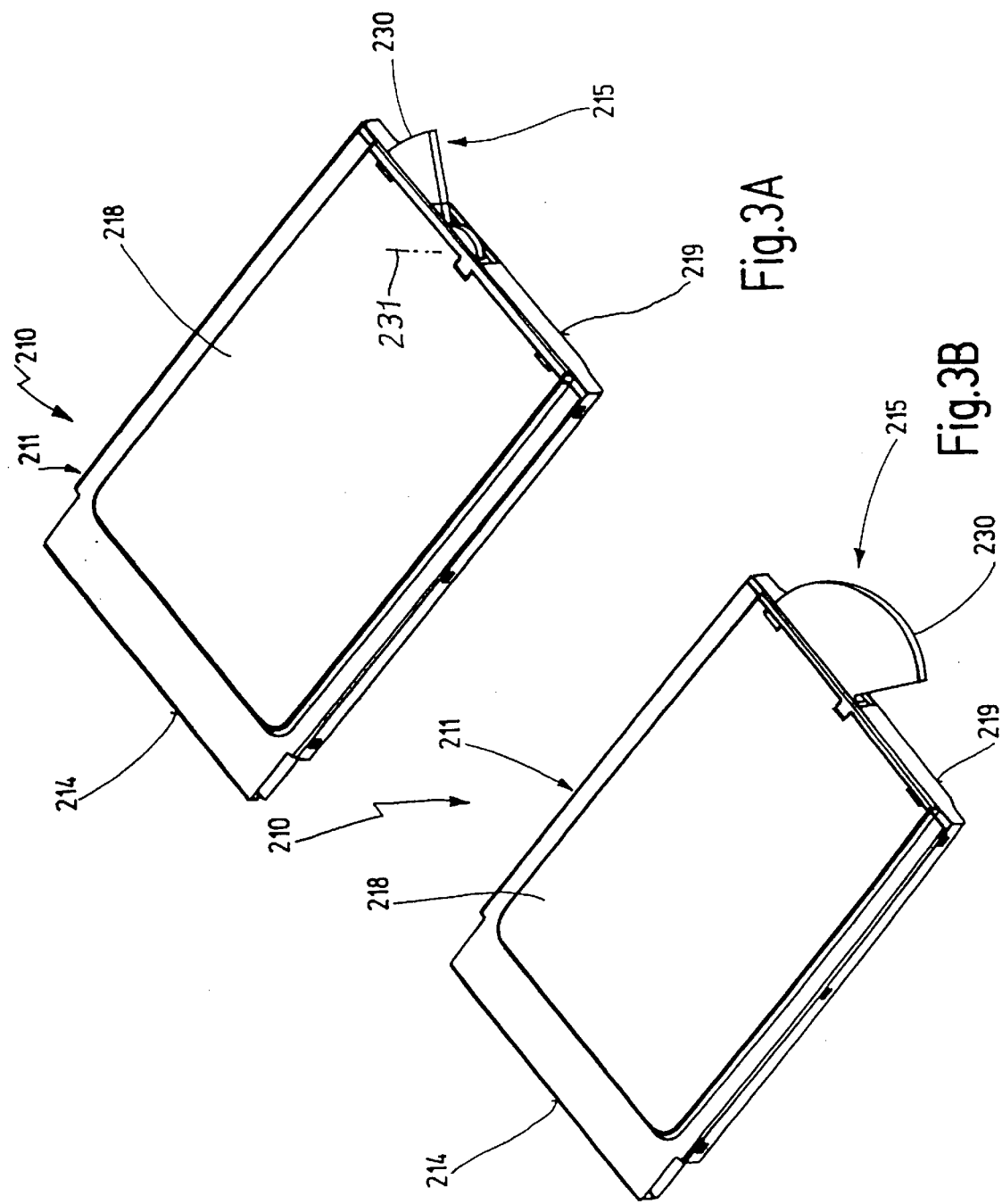

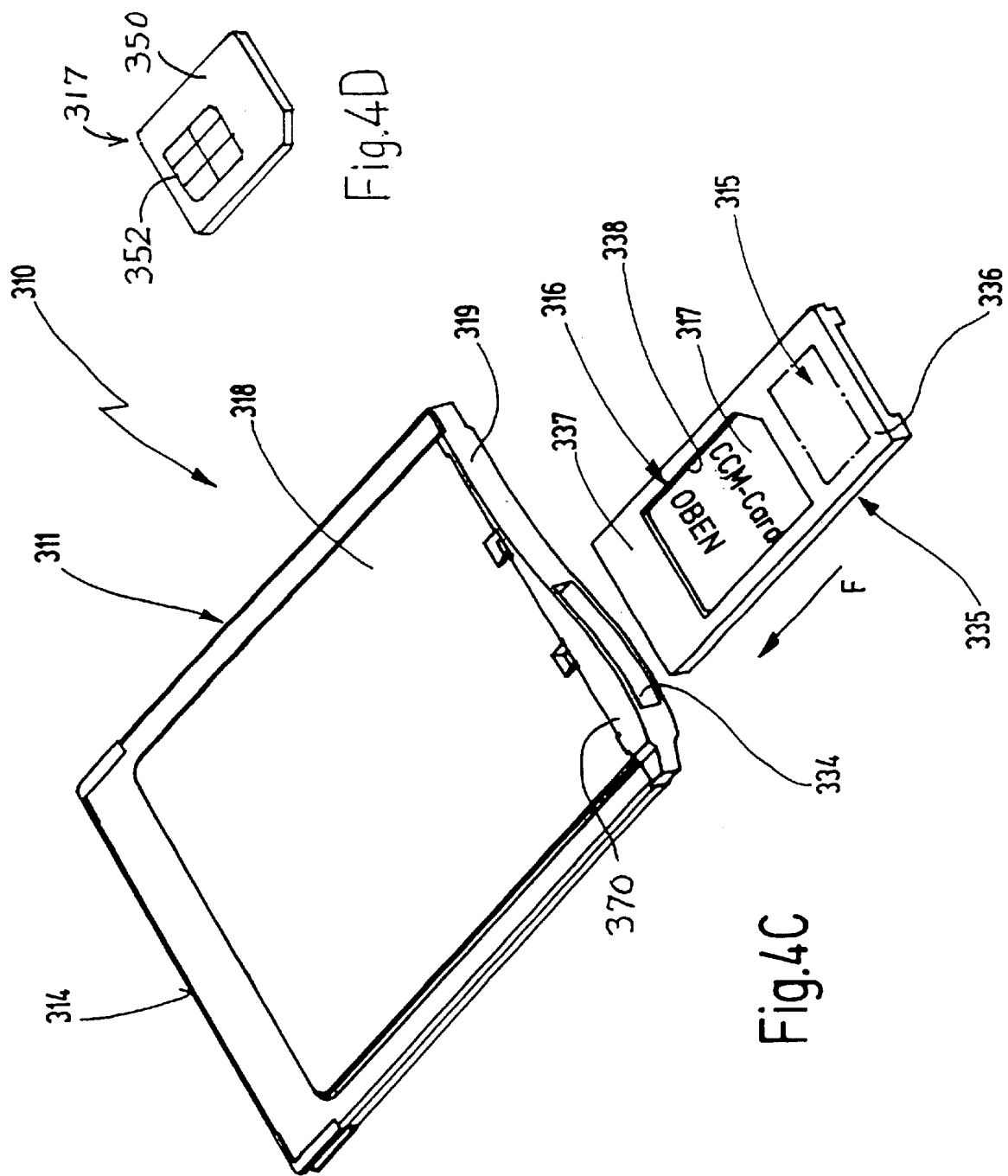

PC CARD FOR ELECTRONIC DEVICES

CROSS-REFERENCE TO RELATED APPLICATION

Applicant claims priority from German patent application 10038287.8 filed Aug. 5, 2000.

BACKGROUND OF THE INVENTION

Portable computers and other electronic devices are often, provided with slots for receiving PC cards, especially those constructed in accordance with PCMCIA (Personal Computer Memory Card Industry Association) standards. Such standards specify PC cards having a width of 54 mm, with Type I cards having a maximum thickness of 3.3 mm, Type II cards having a maximum thickness of 5 mm, and Type III cards having a maximum thickness of 10.5 mm. Type II cards are by far the most popular.

The value of portable computers and the like can be greatly increased by allowing them to transmit and receive signals through radio wave communication systems that are commonly referred to as wireless or mobile phone or cell phone systems. In such systems, a user may insert a smart card such as a SIM card into a mobile telephone, the card containing an electronic chip with data that authorizes the holder to incur charges in making telephone calls. In one system, the smart card identifies an owner to be billed or represents a pre-paid amount stored in or attributed to the smart card that can be reduced by a telephone calling charge.

Portable electronic devices commonly do not have a slot for receiving and connecting to a small smart card, and commonly do not have an antenna or other facilities for making telephone calls. A PC card that enabled a portable electronic device to make telephone calls so as to transmit and receive data, voice, music and other communications by radio waves, and especially through an established wireless telephone network, would be of value.

SUMMARY OF THE INVENTION

In accordance with one embodiment of the present invention, a PC card is provided for insertion into a slot of a portable computer or other electronic device, to enable the device to communicate through radio waves, especially through an existing wireless telephone network. An antenna lies primarily in the PC card in the antenna stowed position. The antenna can be moved rearwardly out a rear end of the PC card housing to a first deployed position so at least most of the antenna projects rearward of the housing rear end. In one arrangement, the antenna comprises an elongated rod forming a radiator that can be pulled rearwardly by a plurality of centimeters out of the rear of the PC card. The radiator is pivotally mounted on a mount, and the radiator can be pivoted to a vertical orientation after it is moved rearwardly out of the PC card, for better radio transmission and reception. The rod can be a resilient leaf spring that holds a 90° bend so a pivot joint is not required.

The antenna can be mounted on a tray that can move from a stowed position wherein the antenna lies within the PC card, rearwardly to a first deployed position wherein the tray has been pulled out and the antenna lies rearward of the PC card. The tray forms a recess for holding a small smart card, of the type having contact pads on one of its faces. Such smart card can authorize use of a wireless telephone network.

The antenna can be mounted for rotation about a vertical axis to pivot from a stowed position within the PC card, to a deployed position rearward of the PC card.

The novel features of the invention are set forth with particularity in the appended claims. The invention will be best understood from the following description when read in conjunction with the accompanying drawings.

BRIEF DESCRIPTION OF THE DRAWINGS

FIG. 1A is a partial rear isometric view, with a portion of the housing broken away, showing a PC card with a rod-shaped antenna in a stowed FIG. 1B is a partial rear isometric view of the PC card of FIG. 1A, with the antenna in a first deployed position.

FIG. 1C is a partial rear isometric view of the PC card of FIG. 1B, with the antenna in a second deployed position.

FIG. 2A is a rear isometric view of a PC card showing an antenna of a second embodiment of the invention in a stowed position.

FIG. 2B is a view similar to that of FIG. 2A, with the antenna in a deployed position.

FIG. 3A is a rear isometric view of a PC card of a third embodiment of the invention, with the antenna substantially in its stowed position.

FIG. 3B is a view similar to that of FIG. 3A, but with the antenna in its deployed position.

FIG. 4C is a view similar to that of FIG. 4B, but with the tray in a second deployed position wherein it has been separated from the rest of the PC card, and with a smart card in the tray.

FIG. 4D is a bottom isometric view of a smart card of the type shown in FIG. 4C.

DESCRIPTION OF THE PREFERRED EMBODIMENTS

Figure 4A:
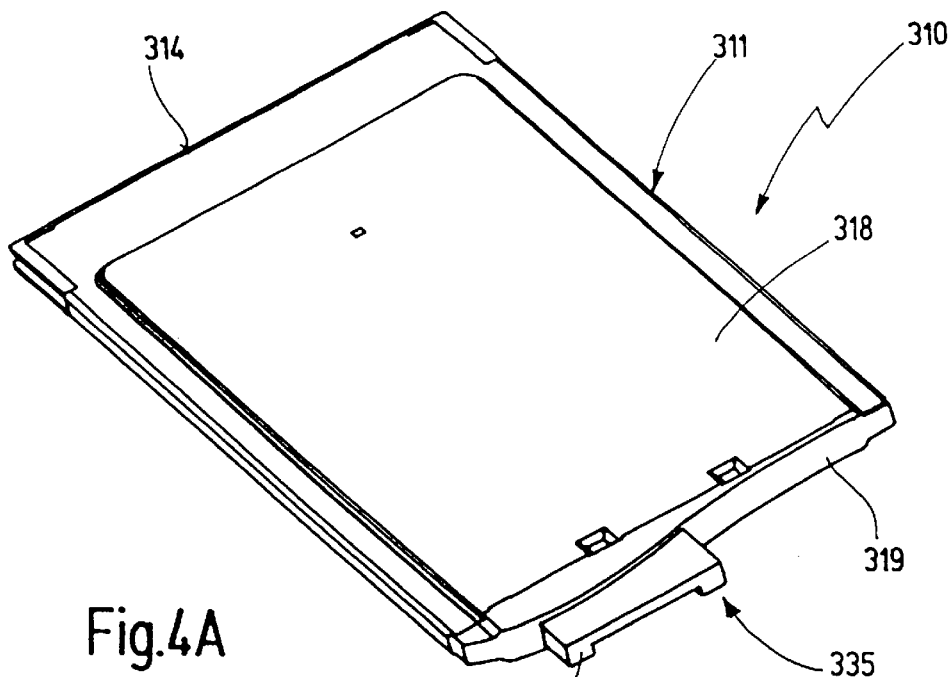
FIG. 4A is a rear and top isometric view of a PC card of a fourth embodiment of the invention, wherein an antenna and smart card-holding recess are mounted on a tray, and showing the tray in substantially its stowed position.

The figures show PC cards of a type designed to be inserted into a slot of a portable computer or other electronic device. FIG. 4B shows a PC card 310 which has been fully inserted in a forward F direction into a slot 350 of an electronic device 352 such as a portable computer. When the PC card has been fully inserted, a front connector 313 at a front end 314 of the PC card engages a device connector 354 of the electronic device. Contacts 356 of the card front connector then mate with contacts 358 of the device connector. As shown in FIG. 5A, the PC card includes a circuit board 312 having front and rear ends 360, 362 adjacent to the front and rear ends of the PC card. The circuit board has conductive traces 364 that connect to tails 366 of the front connector contacts. The PC card includes a housing 311 with sheet metal plates at the top and bottom that lie above and below most of the circuit board, the top plate being shown at 318 in FIG. 4B. FIG. 5A also shows that the housing includes a rear end cap 370 lying rearward of the circuit board, the housing also having opposite sides 372, 374 lying at opposite sides of the circuit board. These features are present in the PC cards of all of the figures (except FIG. 4D). The figures show PC cards 10, 110, 210, 310 with housings 11, 111, 211, 311. Corresponding parts in the different figures have the same last two numerals.

FIG. 1A illustrates a PC card 10 with an antenna 15 in its rear end portion, which is closest to the PC card rear end. The antenna includes a rod-shaped radiator 20 with a front end that is mounted on a foot or mount 21. The rod has a pin 22 at its front end, which lies in grooves 23 of a yoke of the mount, to enable the rod to pivot about a horizontal axis 78 on the mount. The antenna can be pulled rearwardly R out of the PC card housing to the position shown in FIG. 1B wherein the rod extends rearwardly of the housing. In most cases, the slot in the electronic device that receives the PC card lies in a horizontal plane when the device is in use, and it is desirable to pivot the radiator 20 about the pin 21 to the vertical position shown in FIG. 1C, which is parallel to up U and down D directions.

The antenna 15 of FIG. 1A is initially latched in its stowed position shown in that figure, by a double click mechanism 27. When the rear end 24 of the radiator, or rod is pushed forwardly, against the bias of a tension spring 28 that extends to a slide 29, the antenna is released and pushed rearwardly by a few millimeters. Th antenna then can be grasped and pulled rearwardly to the first deployed position of FIG. 1B. Such double click mechanism is well known, and is described in U.S. patent application Ser. No. 09/583,163 filed May 30, 2000. The antenna has an electrical connection arm 31 which is normally out of engagement with a trace 32 at the rear portion of the circuit board. However, when the mount 21 moves to its forward position, the arm engages the trace 32 so radio frequency signals transmitted through conductors of the circuit board to the trace 32, can be carried through the radiator 20 for broadcast. Where the antenna requires a ground plane, this can be provided by the sheet metal top and bottom plates of the PC card or a ground plane of the portable computer. One alternative is to provide a second radiator on the antenna rod, and an additional circuit board trace and antenna contact arm can be provided. It is desirable to not electrically connect the antenna when the antenna is not deployed, because this avoids inadvertent transmission of information.

FIG. 2A illustrates a PC card 110 with an antenna 115 comprising a flexible and resilient leaf spring member or bar 125. In the stowed position such as in FIG. 2A, the flexible and resilient bar 125 extends in the longitudinal direction M within the PC card housing 111. The antenna bar 125 can be pulled rearwardly out of a rear end cap at the rear 119 of the housing until a stop (not shown) prevents any further pullout. The flexible and resilient bar automatically bends, or is bent by hand, so most of the bar extends in a vertical direction that is about 90° from the horizontal longitudinal direction M. The bar can be returned to the stowed position of FIG. 2A for safe keeping. Applicant prefers a flexible and resilient leaf spring bar that maintains itself in either a straight position or a 90° bent position. A spring can be used to retract the bar when pulled rearward a second time.

FIGS. 3A and 3B show a PC card 210 with an antenna 215 comprising a plate 230 bearing a type of antenna commonly referred to as a patch antenna. The plate 230 is pivotally mounted about an axis 231 that is vertical when the upper plate 218 of the PC card lies in a horizontal plane. When pivoted about the axis 231, the plate moves to the deployed position shown in FIG. 3B wherein most of the plate and an antenna on the plate 230, are exposed behind the housing 211 of the PC card. The plate 230 can be completely enclosed in the housing 211 and deployed by pressing in one side of the plate so the plate is pushed out slightly by a double click mechanism, or an opening can be provided for the tip of a pencil or the like to pivot out the plate.

As mentioned earlier, radio communication from a portable computer is preferably conducted through an established wireless telephone network such as a cell phone network. Many of such networks require insertion of a small smart card which contains a thin embedded integrated circuit. Such circuit can identify the user as a subscriber to the network, so the network allows a call to be made to transmit and receive information through radio waves. In another type of system, the smart card or network control station stores a prepayment for phone service, and the network can reduce the amount of stored payment and make the telephone connections. Most portable computers do not have a slot for receiving such authorizing smart card, although many mobile telephones have such a slot. Applicant prefers to provide an opening in the PC card where such a small smart card be inserted so it can be read and written onto to authorize communication. U.S. Pat. No. 6,213,403 shows how a slot in the bottom sheet metal plate of a PC card can be provided to enable insertion of a smart card there. FIG. 4D illustrates a SIM type small smart card, showing that the lower face 350 contains contact pads 352 that are connected to an integrated circuit embedded in the card.

Figure 4B:
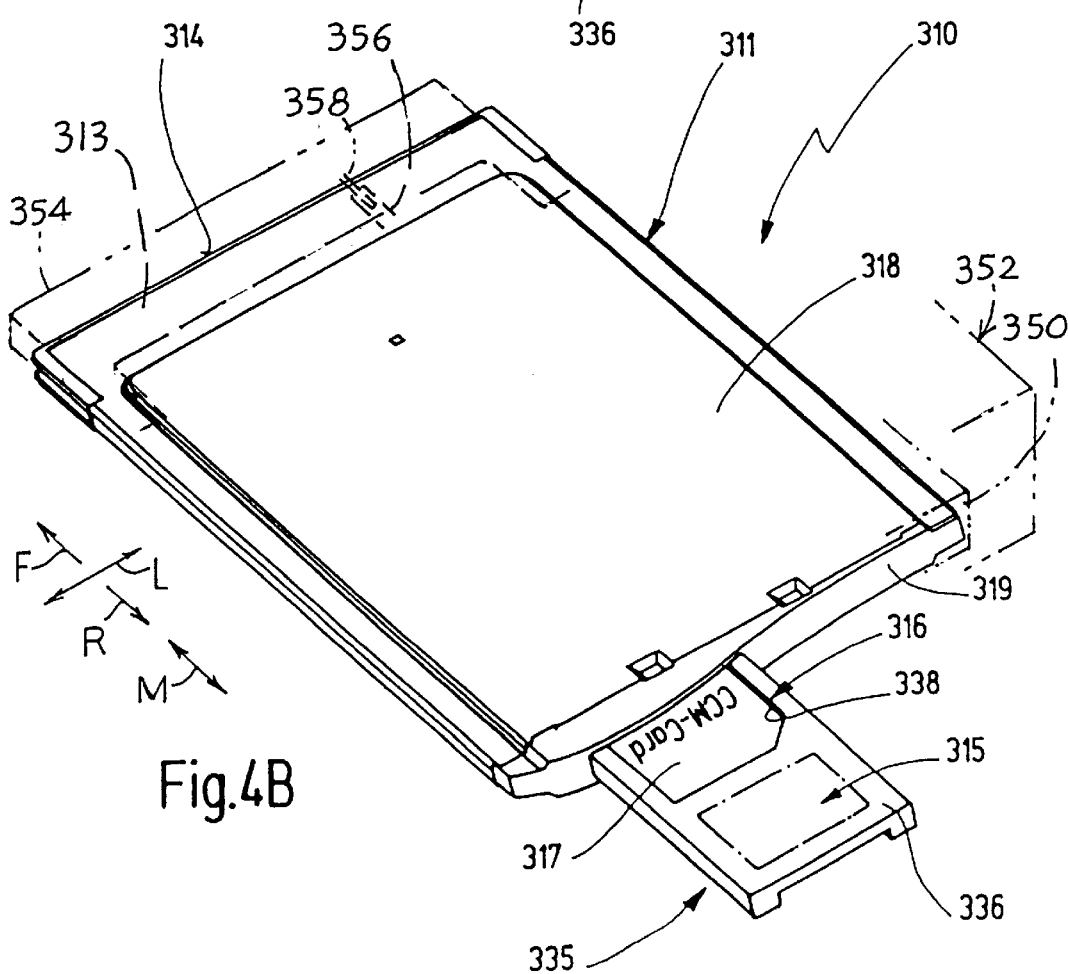
FIG. 4B is a view similar to FIG. 4A, and with the tray in a first deployed position and a smart card in the tray.
Figure 5A:
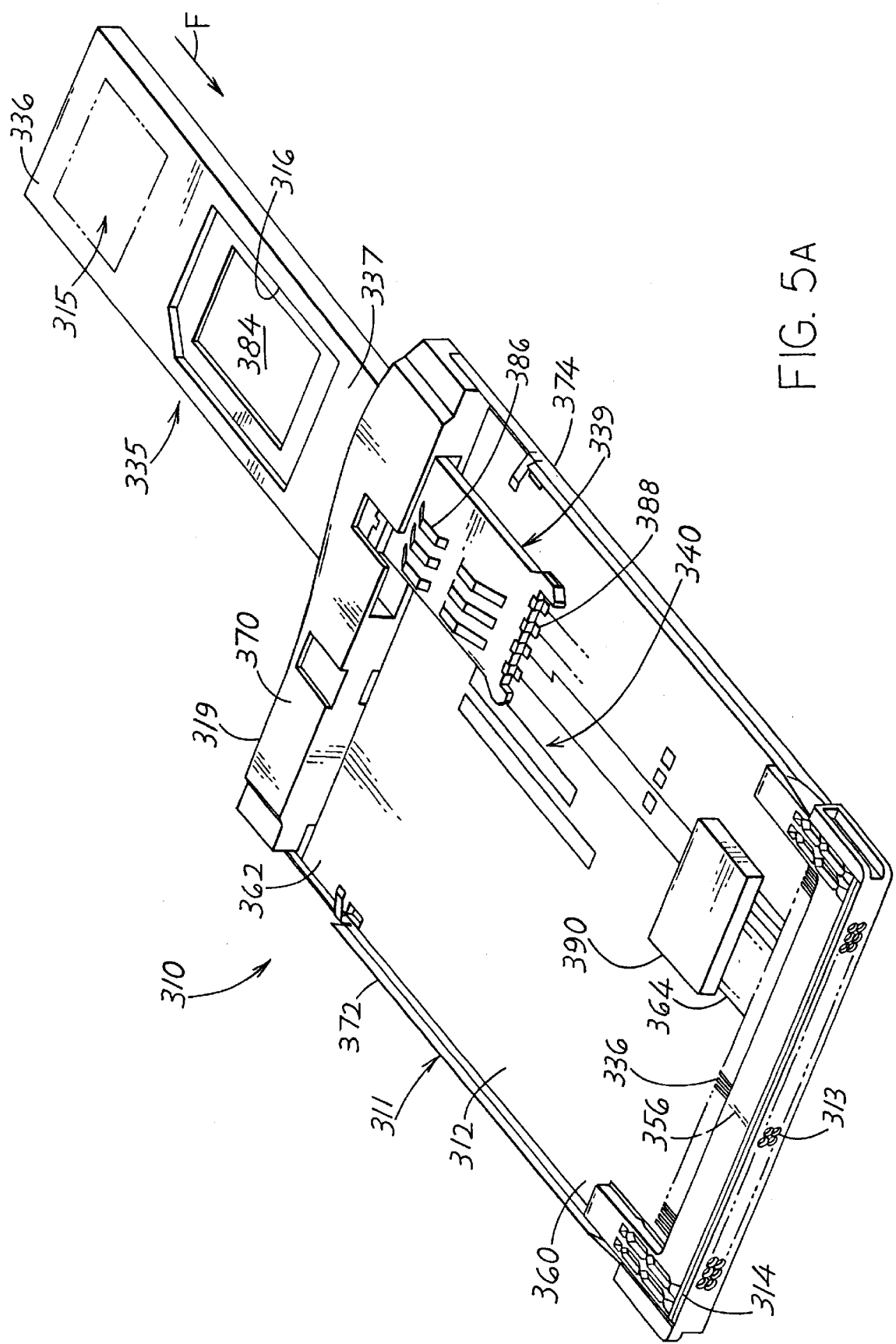
FIG. 5A is a front isometric view of the PC card of FIG. 4C, with the top cover half removed.
Figure 5B:
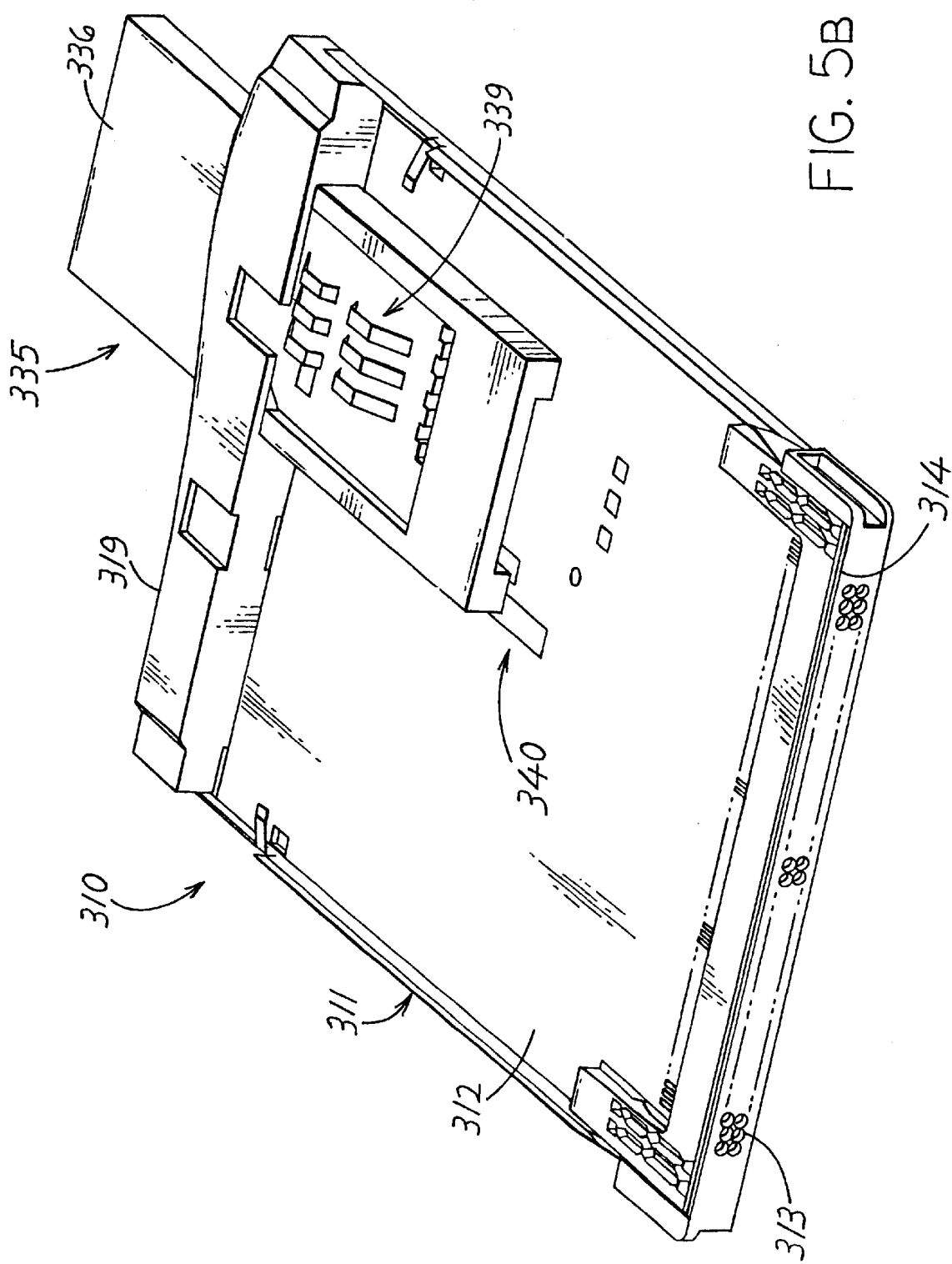
FIG. 5B is a view similar to that of FIG. 5A, but with the tray in the first deployed position.

FIGS. 4A–5B illustrate a PC card 310 (FIG. 4B) with a tray 335 that holds an antenna 315 and that has a smart card receiver 316 comprising a recess 338 for receiving a smart card 317. The recess includes at least four locations spaced about a card to fix its horizontal position on the tray. FIG. 4A shows the tray 335 in its stowed position wherein most of the tray lies in the card housing 311. It is noted that the PC card can be constructed so the tray lies substantially fully enclosed within the PC card housing 311 with the tray rear end 336 substantially flush with the housing rear end 319, in the stowed position. The tray can be moved rearwardly by manually pulling it out, by applying a pointed instrument to the tray to move the pointed instrument through a slot to initially move out the tray, or by a double-click mechanism which requires the tray to be first pushed in slightly.

FIG. 4C shows the tray in a second deployed position, wherein the tray has been pulled through an opening 334 in a rear end cap 370 of the housing and has been separated from the rest of the PC card. The smart card 317 is then laid in the recess 338 and the tray 335 is inserted in a forward direction F through the opening 334 until the tray is in the first deployed position shown in FIG. 4B, wherein the antenna 315 lies rearward of the PC card housing and the smart card 317 lies at least partially in the housing. A latch (not shown) holds the tray in the first deployed position.

FIG. 5A shows that the card-receiving recess 316 has an opening 384 in its bottom. When the card lies in the recess and the tray is slid forwardly to the first deployed position, smart card-engaging contacts 386 of a smart card connector 339 pass through the opening 384 to engage the contact pads on the lower face of the smart card. The smart card connector 339 is fixed in place on the circuit board 312, so tails 388 of the contacts can be soldered to corresponding traces on the circuit board. Thus, while the tray can slide forward and rearward, the smart card contacts that engage contact pads on a smart card on the tray do not move.

The circuit board has traces 340 that are designed to engage contacts of the tray that connect to the antenna 315. Thus, when the tray is in the first deployed position, electrical connections are also made to the antenna.

Applicant prefers to provide one or more circuits 390 in the PC card that are mounted on the circuit board 312. The circuit 390 is connected to contacts 356 of the front connector 313 to provide power to operate the antenna and to read the smart card. In most cases, data or voice signals that are to transmitted or received, pass from the electronic device that receives the PC card, through additional contact 356 through the circuit 390 for processing, such as to use such signals to modulate radio waves for transmission and to demodulate received radio signals. Where the electronic device has a built in radio signal processing circuit such as a modulator and demodulator, radio signals can be transmitted directly through contacts of the front connector to the antenna, and smart card interrogating signals can be transmitted through the front connector to the smart card-engaging contacts.

It is noted that is possible to provide a plug connector strip on the PC card in any of the figures, at its rear end, with such plug connector strip facilitating a cable connection to an internal computer network or to a permanent telephone network.

Thus the invention provides a PC card, especially one constructed in accordance with PCMCIA standards, which enables the radio transmission and reception of signals from an electronic device such as a portable computer. The PC card has an antenna which is movable from a stowed position wherein most of the antenna lies in a housing of the PC card, to at least a first deployed position wherein the antenna has moved at least partially through a rear end opening of the housing to a position primarily rearward of the housing rear end. The antenna includes an electrically conductive radiator, and the PC card includes a circuit mounted on the circuit board and connected to the antenna radiator and to traces at the front end of the circuit board, to pass signals from front connector contacts to the antenna. The PC card preferably has a smart card connector that can receive and connect to contact pads of a smart card, to provide authorization for communication by radio waves through an established network. The antenna can include a rod that is elongated in a longitudinal direction that extends between front and rear ends of the PC card, when in the stowed position. The rod can slide rearwardly so it extends rearward of the PC card, and can pivot to extend vertically for more efficient radio transmission and reception. The rod can be a leaf spring that can assume a 90° bent position. The PC card can include a tray that holds a smart card and that holds an antenna rearward of the smart card. The tray can be moved to a second stowed position for ease in installing the smart card, and then moved forward to the first deployed position wherein smart card-engaging contacts fixed in the PC card engage pads on the smart card while the antenna lies rearward of the PC housing.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A PC card for insertion in a front longitudinal direction into a slot of a portable computer or other electronic device to connect to device contacts of a device connector, where the PC card has front and rear card ends, said PC card including a front connector lying at said card front end and having a plurality of connector contacts, a circuit board with a board front end having traces connected to said connector contacts and a board rear end, a housing that lies above and below most of said circuit board, said housing having opposite housing sides lying at opposite sides of said circuit board and a housing rear end lying rearward of said circuit board, wherein:

said housing includes top and bottom sheet metal plates, and said housing rear end has an opening; and including an antenna which is moveable from a stowed position wherein most of said antenna lies in said housing, and a first deployed position wherein said antenna has been moved at least partially through said housing rear end opening to a position where most of said antenna lies rearward of said housing rear end.

2. The PC card described in claim 1 wherein:

said antenna includes an electrically conductive radiator; and including a circuit mounted on said circuit board and connected to said antenna radiator and to said traces at said front end of said circuit board, to pass signals from said contacts of said front connector to said antenna.

3. The PC card described in claim 1 wherein:

said antenna includes an elongated conductive rod extending in said longitudinal direction, said rod having a rear end that is exposed at said housing rear end and said rod being slideable rearwardly out of said housing;

a double click mechanism that is coupled to said antenna and that holds said antenna in said stowed position in said housing the first time said antenna is pushed forwardly into said housing and that releases said antenna to move rearwardly to said first deployed position the second time said antenna rear end is pushed forwardly.

4. The PC card described in claim 1 wherein:

said antenna includes an antenna mount that is slideable rearwardly in said housing from a stowed position wherein said antenna mount lies forward of said housing rear end, to a deployed position wherein a rear end of said antenna mount substantially projects rearward of said housing rear end;

said antenna also includes an elongated radiator that is mounted on said antenna mount to move from said stowed position wherein said radiator extends in said longitudinal direction and lies in said housing, to a horizontal first deployed position wherein said radiator extends longitudinally and rearward of said housing rear end, said radiator having a front end that is pivotally mounted on said mount to pivot from said horizontal first deployed position to a vertical second deployed position wherein said radiator extends vertically from said mount, said horizontally deployed first position being said first deployed position.

5. The PC card described in claim 1 wherein:

said antenna is pivotally mounted on said PC card about a vertical axis passing through a rear portion of said card, and has a radiator that lies primarily in said housing in said stowed position and that lies primarily rearward of said housing rear end in said first deployed position.

6. The PC card described in claim 1 wherein:

said antenna includes a flexible and resilient elongated leaf spring member that has a front portion that is longitudinally slideable in said housing and a rear portion that is biased to assume a 90° bent configuration wherein said rear portion extends vertically, when said antenna is in said first deployed position.

7. A PC card for insertion in a front longitudinal direction into a slot of a portable computer or other electronic device to connect to device contacts of a device connector, where the PC card has front and rear card ends, and where the PC card includes a front connector lying at said card front end and having a plurality of connector contacts, a circuit board with a board front end having traces connected to said connector contacts and a board rear end, a housing that lies above and below most of said circuit board, said housing having opposite housing sides lying at opposite sides of said circuit board and a housing rear end lying rearward of said circuit board, wherein:

said housing includes top and bottom sheet metal plates, and said housing rear end has an opening;

said circuit board has at least one antenna trace; and including a tray that is moveable longitudinally in said PC card between a stowed position wherein said tray lies primarily in said PC card and a first deployed position wherein at least a rear portion of said tray has moved rearward out through said opening and lies rearward of said PC card;

an antenna mounted on said tray rear portion and connected to said antenna trace on said circuit board.

8. The PC card described in claim 7 wherein:

said tray forms a smart card receiving recess, and including a plurality of smart card-engaging contacts that engage contact pads of a smart card that lies in said card receiving recess in said first deployed position of said tray.

9. The PC card described in claim 8 wherein:

said recess has a bottom wall and said bottom wall has an opening;

said smart card-engaging contacts project through said opening to engage said contact pads of a smart card.

* * * * *